Aug. 18, 1964  J. W. SHERRICK  3,145,004
TRACTION MOTOR NOSE SUPPORT
Filed Dec. 10, 1962  2 Sheets-Sheet 1

INVENTOR.
James W Sherrick
BY
Rodger Hammer
Attorney

Aug. 18, 1964   J. W. SHERRICK   3,145,004
TRACTION MOTOR NOSE SUPPORT
Filed Dec. 10, 1962   2 Sheets-Sheet 2

INVENTOR.
James W. Sherrick
BY Ralph Hammar
attorney

United States Patent Office 3,145,004
Patented Aug. 18, 1964

3,145,004
TRACTION MOTOR NOSE SUPPORT
James W. Sherrick, Edinboro, Pa., assignor to Lord Manufacturing Company, Erie, Pa., a corporation of Pennsylvania
Filed Dec. 10, 1962, Ser. No. 243,516
6 Claims. (Cl. 248—9)

This invention is an improved railway traction motor nose support which eliminates the need for wear plates of prior designs and which provides a positive spring rate to minimize lateral (or sidewise) shock loads of the motor lugs banging into the sides of the truck lugs.

Figure 1:
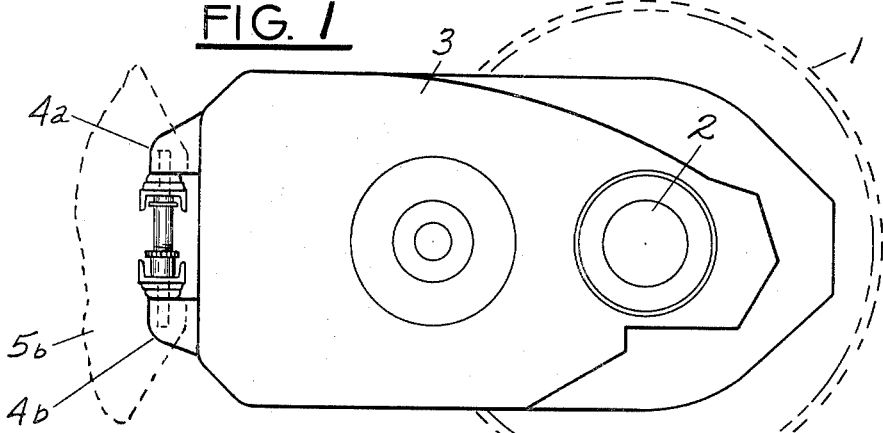
Figure 2:
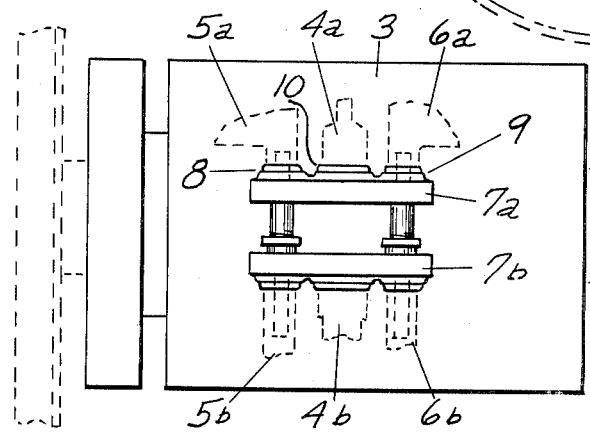
Figure 3:
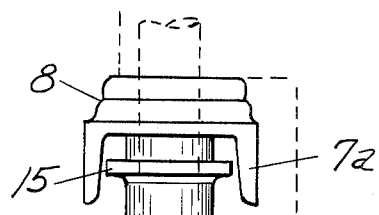
Figure 3:
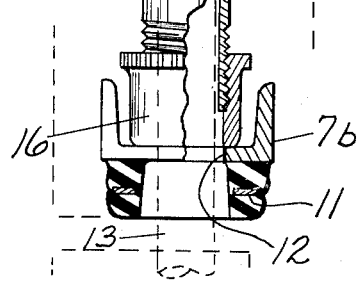
Figure 4:
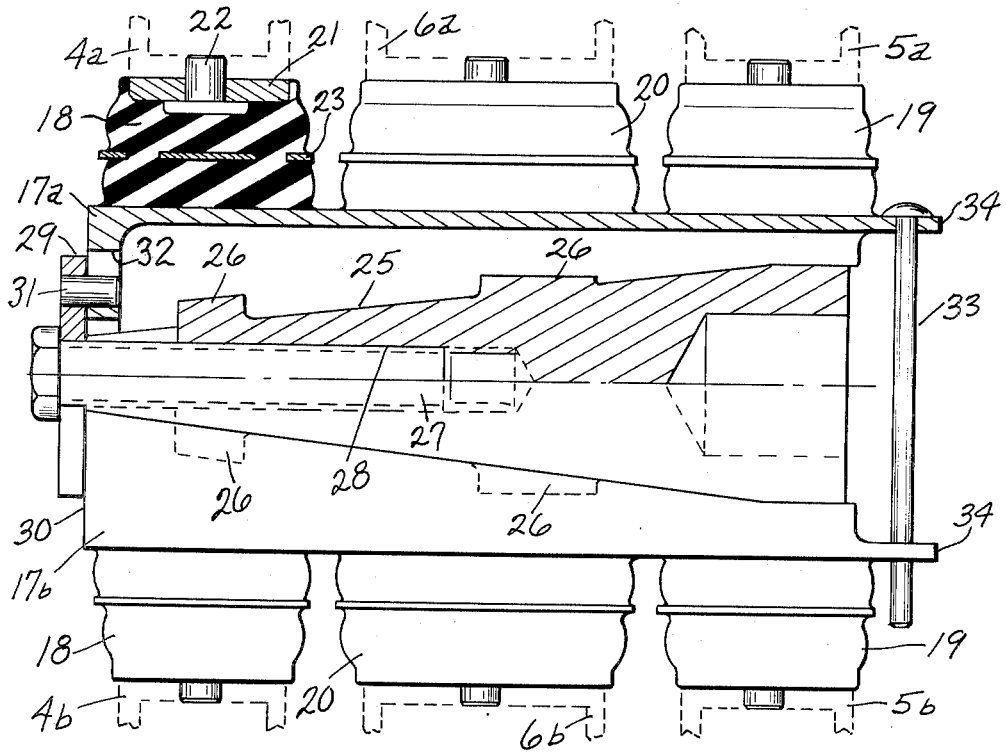
Figure 5:
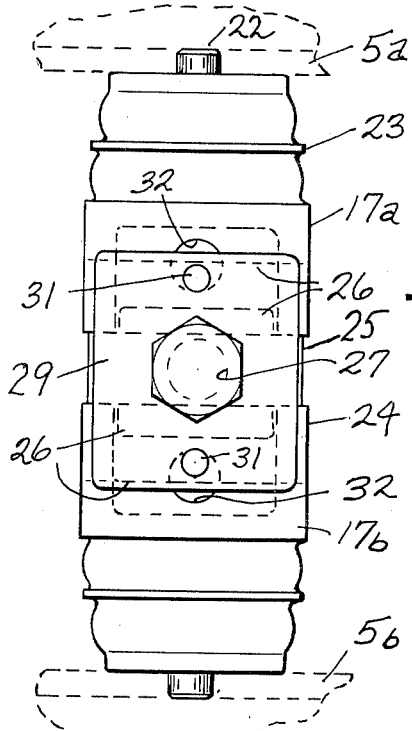

In the drawing, FIG. 1 is a diagrammatic end elevation of a traction motor, FIG. 2 is a front elevation, FIG. 3 is an end view of the motor nose support, FIG. 4 is a front view, partly broken away of a modification, and FIG. 5 is an end view.

In the drawing, 1 indicates the railway wheels fixed to axle 2 and 3 includes a traction motor driving the axle. At the front of the motor are opposed upper and lower nose lugs 4a and 4b arranged between opposed upper and lower truck lugs 5a, 5b and 6a, 6b. The parts so far described are of common construction.

In service, sudden load changes can, and often do, cause a wheel slip-grab condition with the steel coil spring type of motor support. The large build up in motion due to slip-grab is greater than the clearance between spring coils can allow, thus the coils solidly contact each other or bottom. At this point, the motion of the motor housing is suddenly stopped and reversed in direction. The force required to stop this heavy motor and reverse its direction is extremely high and of shock proportions. The full impact of this force tends to make the coil springs take a set, forge wells in the adjacent steel plates, upsets the wear plates to cause greater undesirable clearance, and breaks motor nose lugs.

An intermediate step taken to improve on the above problem was to replace the steel coil springs with a rubber and steel sandwich support. See M P Test Rubber Nose Supports, Railway Locomotives and Cars, August 1962. This part, however, still uses the existing wear plates to accommodate lateral relative motion between truck and motor by sliding on the wear surfaces.

This invention is a further improvement over the rubber sandwich support since it eliminates wear surfaces entirely. Instead of lateral relative motion causing metal to metal sliding, it is now accommodated by distortion in the rubber. Wear plates are eliminated.

Mountings comprise upper and lower beams 7a, 7b of channel section on the outer surface of which are bonded pads 8, 9 of rubber or other suitable elastomer presented toward the truck lugs and a pad 10 presented to the motor lug. The upper and lower lug mountings are identical. Each of the pads may have bonded therein a metal plate 11 to provide proper compression spring rate. The channels 7a, 7b have clearance holes 12 for the guide pins 13.

In assembly, the front end of the motor is blocked up to nearly correct position relative to the truck and the nose support is assembled loosely in place with the pads 8, 9 and 10 presented to the adjacent frame and motor lugs and with the guide pins 13 extending through tubular posts 14. The upper ends of the posts engage the bottom of the channel 7a and are prevented from turning in the channel by a plate 15. At the lower ends of the posts are nuts 16 which engage the bottom of the channel 7b. After the support has been loosely assembled, the nuts 16 are turned to compress the pads against the associated lugs. The initial compression of the pads provides the desired preload preventing lost motion and also anchors the pads to the lugs.

The torque impulses caused by slip grab conditions, reversals and the like are cushioned by the elastomeric pads. Downward forces are transmitted from the upper motor lug 4a through the associated pad 10 to the lower frame lugs 5b, 6b through the pads 8 and 9. Upward forces are similarly transmitted through the associated pads from the lower motor lug 4b to the upper frame lugs 5a and 6a.

In the modification of FIGS. 4 and 5, there are identical upper and lower beams 17a and 17b of channel section on the outer surface of which are bonded pads 18, 19 of elastomer presented toward the truck lugs and a pad 20 presented toward the motor lug. Each of the pads is bonded to a plate 21 carrying a dowel pin 22 received in a hole in the associated lug and has bonded therein a plate 23 to prevent bulging under compression load. The pin 22 anchors the plate 21 to the lug so there is no sliding relative to the lug under forces lengthwise or crosswise of the beams. The sides 24 of the channels have edges tapered longitudinally at an acute angle and cooperating with a wedge 25 having keying projections 26 slidably received between the flanges. The wedge is moved longitudinally to vary the preload on the pads 18–20 by a bolt 27 screwed into an internally threaded bore 28 in the wedge. The head of the bolt bears on a thrust plate 29 engaging end walls 30 of the channels and non rotatably connected thereto by pins 31 extending through clearance holes 32. At the end opposite the bolt 27, the beams 17a, 17b are connected by a pin 33 slidably extending through ears 34.

In the assembly, the motor is blocked into nearly correct position and the beams 17a, 17b and wedges 25 assembled in place. Tightening the bolt 27 wedges the beams apart and preloads the pads 18, 19, 20 to the desired extent.

In both constructions, movement of the motor lugs relative to the truck lugs is cushioned and the wear plates are eliminated. The cushioning is effective in all directions. In FIGS. 1 to 3, the pads 8, 9, 10 are stressed in compression by forces perpendicular to the beams and the pads 10 are stressed in shear forces lengthwise and crosswise of the beams. In FIGS. 4 and 5 the pads 18, 19, 20 are stressed in shear by forces in directions lengthwise and crosswise of the beams and in compression by forces perpendicular to the beams.

What is claimed as new is:

1. A support for a traction motor having a pair of opposed upper and lower nose lugs, two pairs of opposed upper and lower truck lugs with the upper truck lugs on opposite sides of the upper nose lug and the lower truck lugs on opposite sides of the lower nose lug, upper and lower beams respectively spaced below and above the upper and lower lugs and carrying bodies of elastomer respectively presented to the upper and lower lugs, guide pins extending through the upper and lower truck lugs and beams, and tubular posts telescoped over the guide pins and having opposite ends engaging said beams, said posts having means for lengthening the same to force the beams apart and to preload the said bodies against the associated lugs.

2. A support for a traction motor having a pair of opposed upper and lower nose lugs, two pairs of opposed upper and lower truck lugs with the upper truck lugs on opposite sides of the upper nose lug and the lower truck lugs on opposite sides of the lower nose lug, upper and lower beams respectively spaced below and above the upper and lower lugs and carrying bodies of elastomer respectively presented to the upper and lower lugs, means between the beams for forcing the beams apart to preload the said bodies against the associated lugs.

3. A support for a traction motor having a pair of opposed upper and lower nose lugs, two pairs of opposed upper and lower truck lugs with the upper truck lugs on opposite sides of the upper nose lug and the lower truck lugs on opposite sides of the lower nose lug, upper and lower channels respectively spaced below and above the upper and lower lugs, said channels having bodies of elastomer bonded to the outer surfaces thereof and respectively presented and having means anchoring the same to the upper and lower lugs, and tubular posts telescoped having opposite ends engaging the bottoms of said channels, said posts having means for lengthening the same to force the channels apart and preload the said bodies against the associated lugs.

4. A support for a traction motor having a pair of opposed upper and lower nose lugs, two pairs of opposed upper and lower truck lugs with the upper truck lugs on opposite sides of the upper nose lug and the lower truck lugs on opposite sides of the lower nose lug, upper and lower channels respectively spaced below and above the upper and lower lugs, said channels having bodies of elastomer bonded to the outer surfaces thereof and respectively presented toward the upper and lower lugs and having means anchoring the same to the upper and lower lugs, said channels having flanges with inclined edges presented toward each other, wedge means between and engaging said edges for forcing the channels apart to preload said bodies against the associated lugs.

5. A support for a traction motor having a pair of opposed upper and lower nose lugs, two pairs of opposed upper and lower truck lugs with the upper truck lugs on opposite sides of the upper nose lug and the lower truck lugs on opposite sides of the lower nose lug, upper and lower beams respectively spaced below and above the upper and lower lugs and carrying bodies of elastomer respectively presented to the upper and lower lugs, means between the beams for forcing the beams apart to preload the said bodies against the associated lugs, and means for anchoring the bodies to the associated lugs.

6. In combination, a supporting and a supported member, one member having a pair of opposed upper and lower first lugs, the other member having two pairs of opposed upper and lower second lugs with the upper second lugs on opposite sides of the upper first lug and the lower second lugs on opposite sides of the lower first lug, upper and lower beams respectively spaced below and above the upper and lower lugs and carrying bodies of elastomer respectively presented to the upper and lower lugs, means between the beams for forcing the beams apart to preload the said bodies against the associated lugs.

References Cited in the file of this patent
UNITED STATES PATENTS

| 2,281,955 | Rosenzweig | May 5, 1942 |
| 2,987,291 | Dyson | June 6, 1961 |

FOREIGN PATENTS

| 850,805 | France | Sept. 18, 1939 |